United States Patent
Iida et al.

(10) Patent No.: US 11,294,057 B2
(45) Date of Patent: Apr. 5, 2022

(54) DISPLACEMENT SENSOR

(71) Applicant: OMRON Corporation, Kyoto (JP)

(72) Inventors: Yusuke Iida, Ayabe (JP); Ryosuke Tsuzuki, Ayabe (JP); Shoichi Ohnaka, Kameoka (JP); Koji Iguchi, Fukuchiyama (JP); Osamu Harada, Ayabe (JP)

(73) Assignee: OMRON Corporation, Kyoto (JP)

( * ) Notice: Subject to any disclaimer, the term of this patent is extended or adjusted under 35 U.S.C. 154(b) by 770 days.

(21) Appl. No.: 16/127,256

(22) Filed: Sep. 11, 2018

(65) Prior Publication Data

US 2019/0129033 A1 May 2, 2019

(30) Foreign Application Priority Data

Oct. 27, 2017 (JP) .............................. JP2017-208308

(51) Int. Cl.
*G01S 17/14* (2020.01)
*G01S 7/4865* (2020.01)
(Continued)

(52) U.S. Cl.
CPC .............. *G01S 17/14* (2020.01); *G01S 7/487* (2013.01); *G01S 7/4861* (2013.01);
(Continued)

(58) Field of Classification Search
CPC ...... G01S 7/4873; G01S 7/4865; G01S 17/10; G01S 7/4868; G01S 7/4816; G01S 17/42;
(Continued)

(56) References Cited

U.S. PATENT DOCUMENTS 5,179,286 A 1/1993 Akasu
5,623,335 A * 4/1997 Bamberger .............. G01C 3/08
356/5.01
(Continued)

FOREIGN PATENT DOCUMENTS

DE 102018220932 A1 * 6/2020 ........... G01S 7/4865
EP 2315045 4/2011
(Continued)

OTHER PUBLICATIONS

"Office Action of Japan Counterpart Application" with English translation thereof, dated Jan. 26, 2021, p. 1-p. 8.
(Continued)

*Primary Examiner* — Luke D Ratcliffe
(74) *Attorney, Agent, or Firm* — JCIPRNET

(57) ABSTRACT

A displacement sensor includes an emitting unit periodically emitting pulse signals; a receiving unit receiving reflection signals generated from the pulse signals and reflected by an object and outputs binary signals that indicate signal intensity of the received reflection signals; a waveform summation unit generating a summation waveform by accumulating temporal waveforms of the binary signals for the respective corresponding periods of time with reference to emission timings of the corresponding pulse signals; a distance calculation unit calculating a value that indicates a distance to the object on the basis of waveform features corresponding to waveform features of the pulse signals that appear in the summation waveform; and a reception signal amount calculation unit calculating a reception signal amount that is intensity of the reflection signals received by the receiving unit on the basis of feature amounts indicated by cumulative values that appear in the summation waveform.

8 Claims, 10 Drawing Sheets

(A)

(B)

(51) Int. Cl.
*G01S 7/4861* (2020.01)
*G01S 17/10* (2020.01)
*G01S 17/88* (2006.01)
*G01S 7/487* (2006.01)
*G06F 16/248* (2019.01)

(52) U.S. Cl.
CPC ............ *G01S 7/4865* (2013.01); *G01S 17/10* (2013.01); *G01S 17/88* (2013.01); *G06F 16/248* (2019.01)

(58) Field of Classification Search
CPC ...... G01S 7/4863; G01S 7/497; G01S 7/4802; G01S 17/931
See application file for complete search history.

(56) References Cited

U.S. PATENT DOCUMENTS

| | | | |
|---|---|---|---|
| 2006/0181527 A1* | 8/2006 | England | G01S 17/89 345/419 |
| 2015/0102205 A1 | 4/2015 | Baba et al. | |
| 2017/0090019 A1 | 3/2017 | Slobodyanyuk et al. | |

FOREIGN PATENT DOCUMENTS

| | | | |
|---|---|---|---|
| EP | 2942644 B1 * | 5/2016 | ........... G01S 7/4865 |
| JP | S61102575 | 5/1986 | |
| JP | H0772237 | 3/1995 | |
| JP | 0886875 | 4/1996 | |
| JP | 2005077379 | 3/2005 | |
| JP | 2007256191 | 10/2007 | |
| JP | 2008180593 | 8/2008 | |
| JP | 2011089986 | 5/2011 | |
| JP | 2017073322 | 4/2017 | |
| WO | 9960419 | 11/1999 | |
| WO | 2008152647 | 12/2008 | |

OTHER PUBLICATIONS

"Search Report of Europe Counterpart Application", dated Mar. 14, 2019, p. 1-p. 7.

* cited by examiner (A)

| Filter width | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| Weight | Each $\pm 2^{\pm(n-1)}$, n = 1 to 5 (set for each width) | | | | | | | | | | | | | | |

(B)

DISPLACEMENT SENSOR

CROSS REFERENCE TO RELATED APPLICATION

The disclosure claims priority under 35 U.S.C. § 119 to Japanese Application No. 2017-208308 filed Oct. 27, 2017, the entire content of which is incorporated herein by reference.

BACKGROUND

Technical Field

The present disclosure relates to a displacement sensor of a time of flight (TOF) method.

Description of Related Art

A TOF method is known as a method of measuring displacement of an object in a non-contact manner. In the TOF method, a pulse signal (typically, pulse light) is emitted to an object, a reflection signal reflected by the object is received, and a displacement is calculated on the basis of a time difference between emission of the pulse signal and reception of the reflection signal.

For example, Japanese Unexamined Patent Application Publication No. 2011-089986 (Patent Document 1) discloses a configuration in which signals are sent at specific transmission times, reception signals are scanned in every measurement period, the thus reception signals are summed over multiple measurement periods to create a histogram, and the reception times are recognized on the basis of passing through a zero-point, a local maximum, a local minimum, or an inflection point of an interpolation function of the histogram.

PATENT DOCUMENTS

[Patent Document 1] Japanese Unexamined Patent Application Publication No. 2011-089986

In the TOF method, displacement of an object is measured on the basis of reflection signals from an object. Meanwhile, there is also a case in which it is not possible to receive sufficient reflection signals depending on the distance to an object, a reflectance of the surface of the object, and the like. In such a case, an S/N (signal to noise) ratio substantially decreases, and accurate measurement may not be able to be realized.

Such a problem is not examined in Japanese Unexamined Patent Application Publication No. 2011-089986 (Patent Document 1) described above.

SUMMARY

According to an exemplary embodiment of the present disclosure, there is provided a displacement sensor including: an emitting unit that periodically emits pulse signals; a receiving unit that receives reflection signals that are generated from the pulse signals emitted from the emitting unit and reflected by an object and outputs binary signals that indicate signal intensity of the received reflection signals; a waveform summation unit that generates a summation waveform by accumulating a plurality of temporal waveforms of the binary signals for the respective corresponding periods of time with reference to emission timings of the corresponding pulse signals; a distance calculation unit that calculates a value that indicates a distance to the object on the basis of waveform features corresponding to waveform features of the pulse signals that appear in the summation waveform; and a reception signal amount calculation unit that calculates a reception signal amount that is an intensity of the reflection signals received by the receiving unit on the basis of feature amounts indicated by one or a plurality of cumulative values that appear in the summation waveform. Here, "feature amounts indicated by one or a plurality of cumulative values" means features indicated by cumulative values in a specific one or a plurality of periods of time from among results accumulated for the respective periods of time. For example, the feature amounts can be determined by paying attention to a cumulative value in a specific period of time (that is, the magnitude of the amount in the cumulative direction), or the feature amounts can be determined by paying attention to the respective cumulative values in a plurality of periods of time. That is, the reception signal amount is calculated by utilizing a value that reflects at least one cumulative value in the present disclosure.

BRIEF DESCRIPTION OF THE DRAWINGS (A) of FIG. 1 is a perspective view illustrating an exterior configuration of a displacement sensor according to an embodiment, and (B) of FIG. 1 is a perspective view illustrating the exterior configuration of the displacement sensor in a different view.

FIG. 2 is a schematic diagram for describing an outline of displacement measurement using the displacement sensor according to the embodiment.

(A) to (D) of FIG. 3 are schematic diagrams for generally describing processing of displacement measurement using the displacement sensor according to the embodiment.

FIG. 4 is a schematic diagram illustrating an example of a hardware configuration of the displacement sensor according to the embodiment.

(A) to (C) of FIG. 5 are schematic diagrams for describing processing content of rough measurement using the displacement sensor according to the embodiment.

Figure 8:
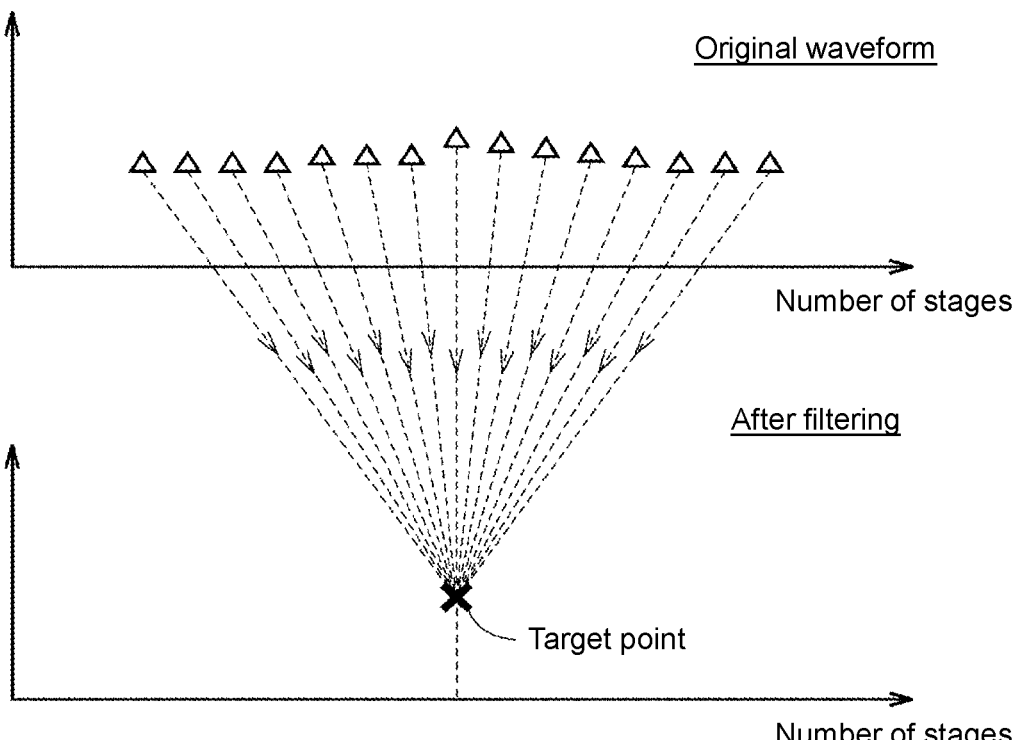

(A) and (B) of FIG. 8 are schematic diagrams for describing processing content of filtering processing using the displacement sensor according to the embodiment.

Figure 9:
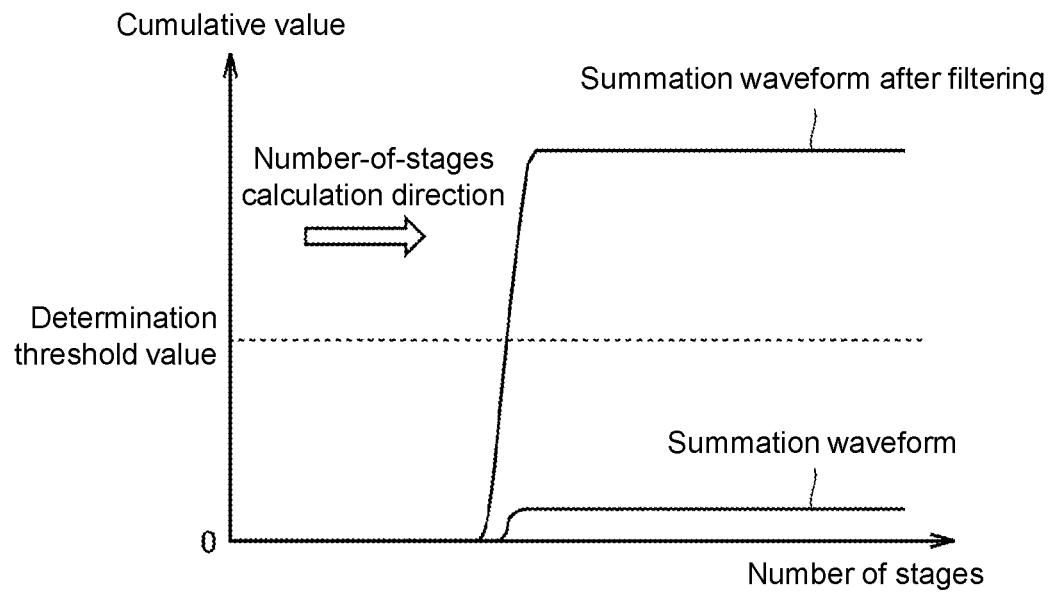

FIG. 9 is a diagram illustrating an example of a summation waveform obtained through the filtering processing using the displacement sensor according to the embodiment.

Figure 10:
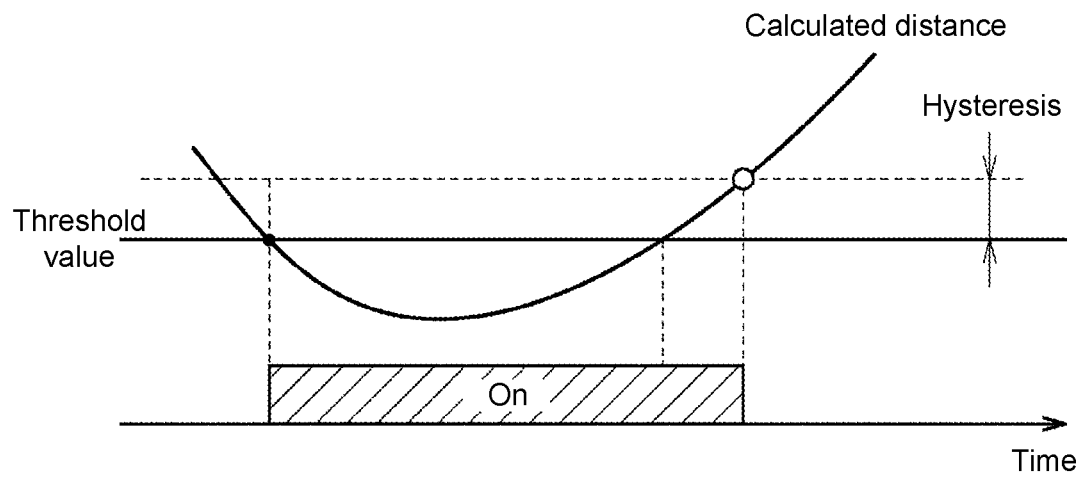

FIG. 10 is a diagram for describing an example of hysteresis set for an output determination unit in the displacement sensor according to the embodiment.

Figure 11:
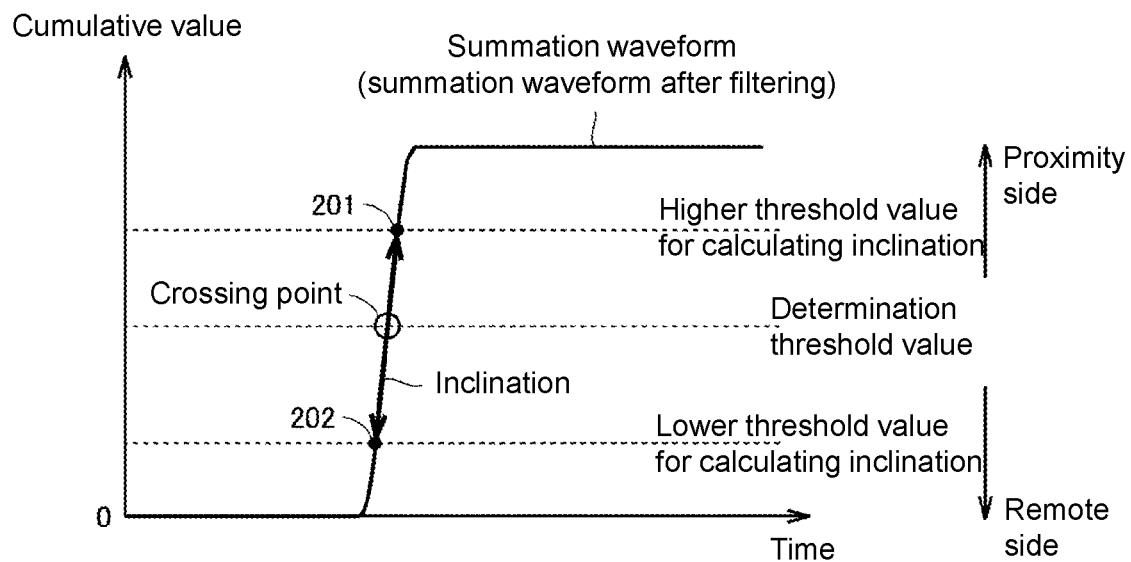

FIG. 11 is a diagram for describing a method of calculating a reception signal amount on the basis of an inclination of the summation waveform by using the displacement sensor according to the embodiment.

Figure 12:
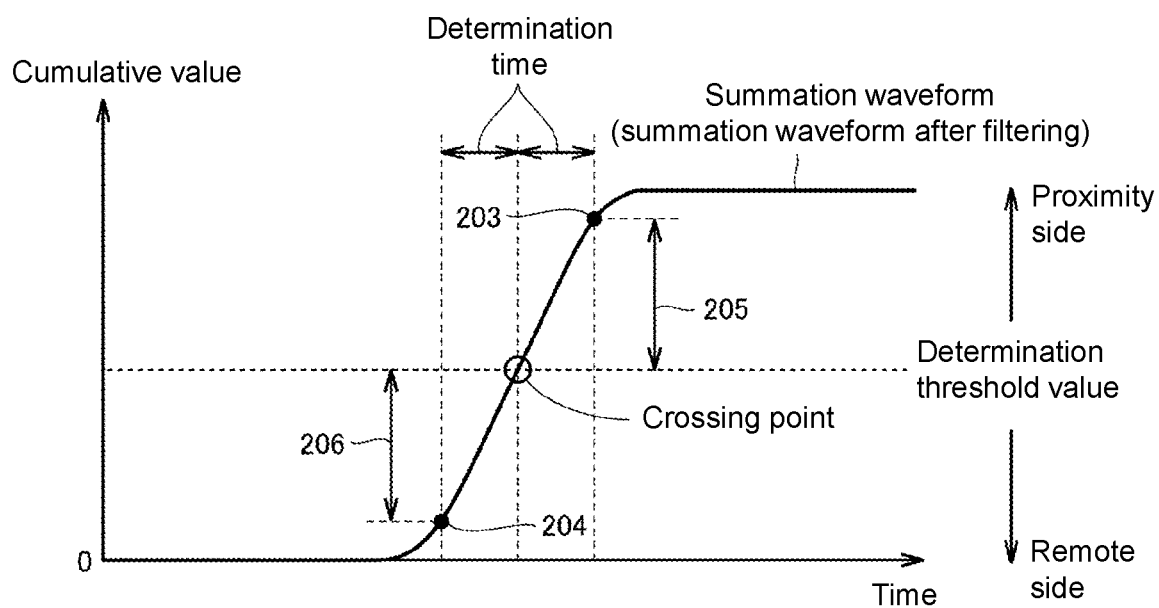

FIG. 12 is a diagram for describing another method of calculating the reception signal amount on the basis of the inclination of the summation waveform by using the displacement sensor according to the embodiment.

Figure 13:
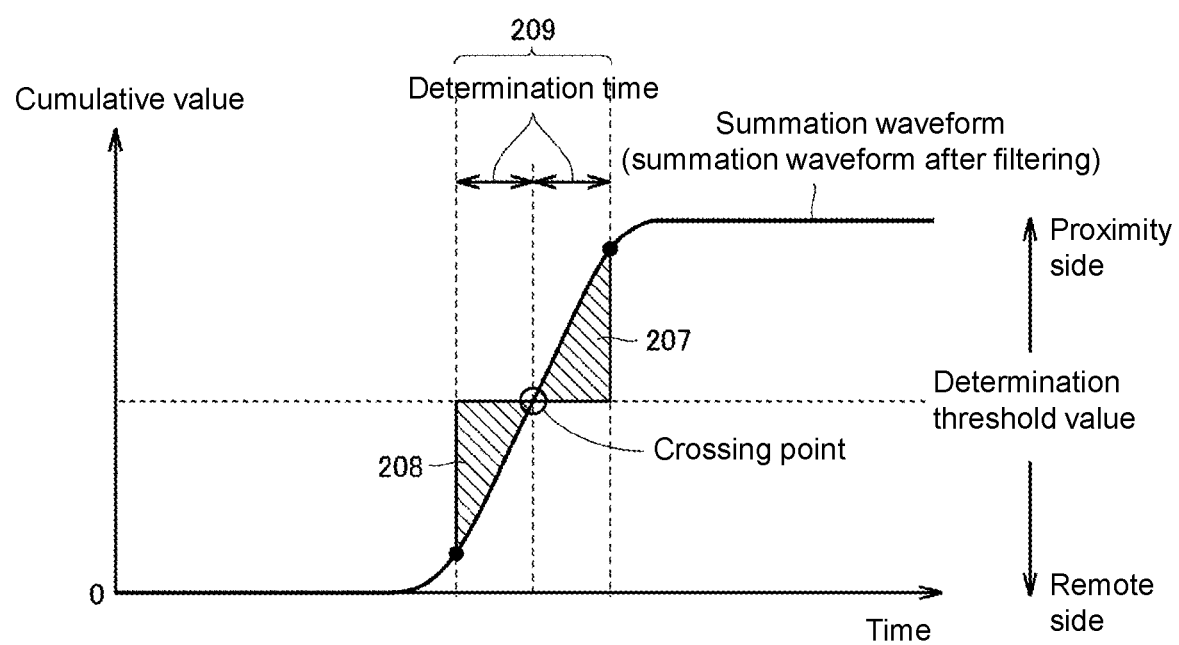

FIG. 13 is a diagram for describing a method of calculating the reception signal amount on the basis of an area defined by the summation waveform by using the displacement sensor according to the embodiment.

Figure 14:
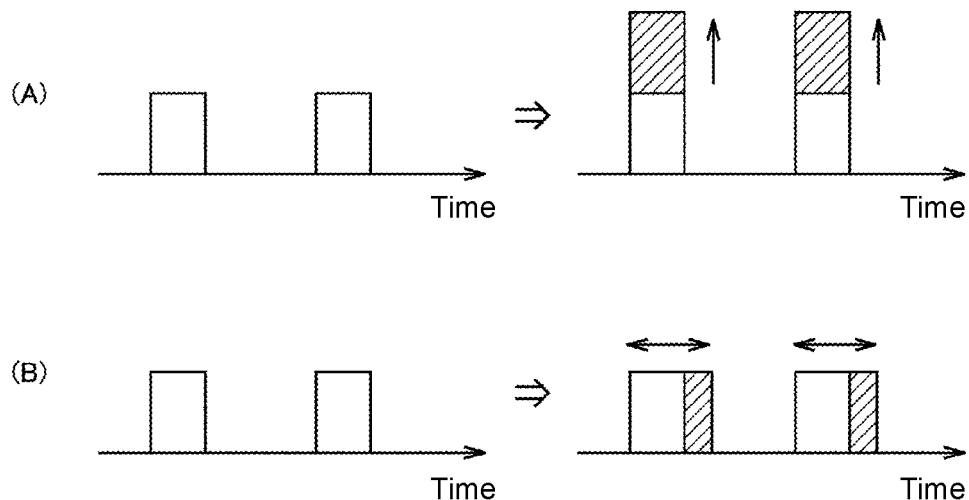

(A) and (B) of FIG. 14 are diagrams for describing an example of adjustment of intensity of an emitted pulse in the displacement sensor according to the embodiment.

Figure 15:
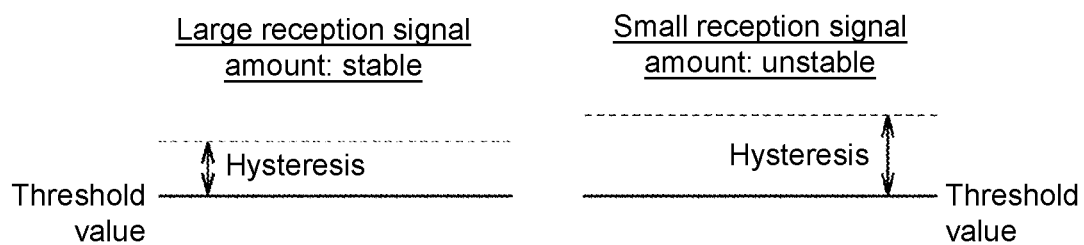

FIG. 15 is a diagram for describing an example of processing of adjusting a hysteresis width that is used for setting a threshold value in the displacement sensor according to the embodiment.

DESCRIPTION OF THE EMBODIMENTS

Accordingly, the present disclosure provides a displacement sensor of a TOF method capable of acquiring a state of a reception signal amount of reflection signals from an object in an arbitrary measurement state.

According to an embodiment of the present disclosure, the displacement sensor further includes an output unit that visually outputs information indicating the magnitude of the calculated reception signal amount.

According to an embodiment of the present disclosure, the displacement sensor further includes an output unit that externally outputs information indicating the magnitude of the calculated reception signal amount.

According to an embodiment of the present disclosure, the emitting unit causes at least one of the intensity and the length of an emitting period of a pulse signal to be emitted, to change in accordance with the magnitude of the calculated reception signal amount.

According to an embodiment of the present disclosure, the receiving unit causes reception gains with respect to the reflection signals to change in accordance with the magnitude of the calculated reception signal amount.

According to an embodiment of the present disclosure, the waveform summation unit causes the number of temporal waveforms of the binary signals that are used to generate the summation waveform to change in accordance with the magnitude of the calculated reception signal amount.

According to an embodiment of the present disclosure, the displacement sensor further includes an output determination unit that determines whether or not an object is present on the basis of a value indicating the distance calculated by the distance calculation unit, and the output determination unit changes a hysteresis width for switching between a determination result that an object is present and a determination result that an object is not present, in accordance with the magnitude of the calculated reception signal amount.

According to an embodiment of the present disclosure, the reception signal amount calculation unit calculates the reception signal amount on the basis of the magnitude of an inclination of a region that corresponds to a rising portion or a falling portion of the pulse signals and appears in the summation waveform.

According to an embodiment of the present disclosure, the reception signal amount calculation unit calculates the reception signal amount on the basis of a magnitude of the amount in a cumulative direction that appears in the summation waveform and is associated with a predefined reference point.

According to an embodiment of the present disclosure, the reception signal amount calculation unit calculates the reception signal amount on the basis of an area that appears in the summation waveform, is associated with a predefined reference point, and is defined by the summation waveform.

According to an embodiment of the present disclosure, the displacement sensor further includes a filtering processing unit that performs filtering processing on a summation waveform that is generated by the waveform summation unit. The reception signal amount calculation unit calculates the feature amounts indicated by the one or the plurality of cumulative values from the summation waveform that the filtering processing is performed by the filtering processing unit.

According to the embodiment of the present disclosure, it is possible to realize a displacement sensor of a TOF method capable of acquiring a state of a reception signal amount of reflection signals from an object in an arbitrary measurement state.

An embodiment of the present disclosure will be described in detail with reference to drawings. Note that the same reference numerals will be given to the same or corresponding parts in the drawings and the description thereof will not be repeated.

A. Exterior Configuration of Displacement Sensor

Figure 1:
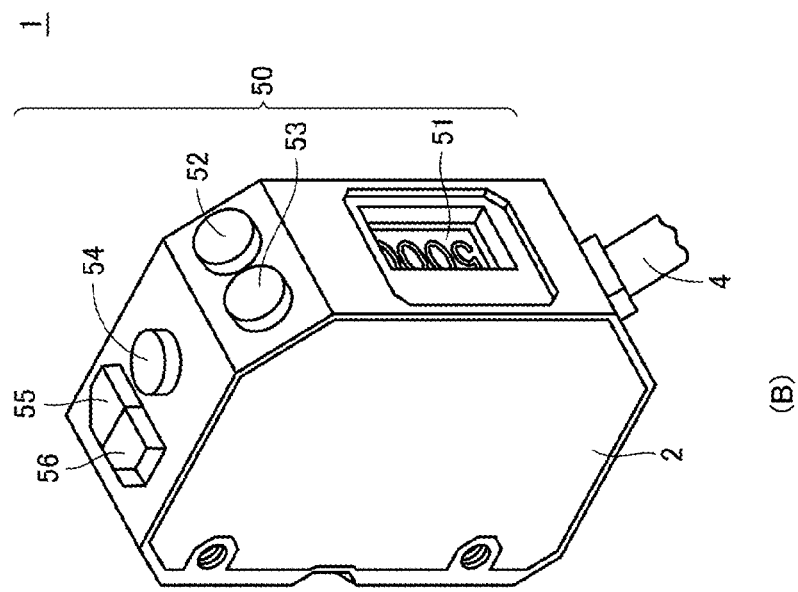
Figure 1:
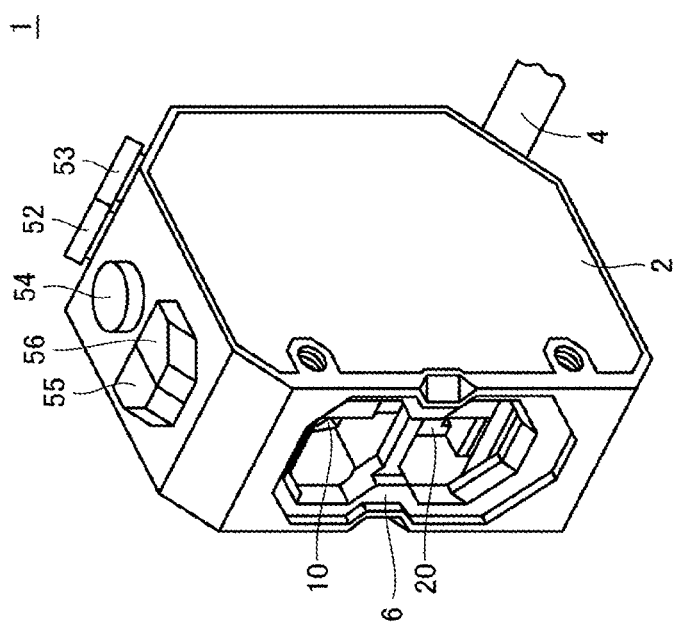

First, an example of an exterior configuration of a displacement sensor 1 according to the embodiment will be described. (A) of FIG. 1 is a perspective view illustrating the exterior configuration of the displacement sensor 1 according to the embodiment, and (B) of FIG. 1 is a perspective view illustrating the exterior configuration of the displacement sensor 1 in a different view. Referring to FIG. 1, the displacement sensor 1 has a case body 2, and a connection unit 4, a light projecting and receiving unit 6, and a display operation unit 50 are arranged in the case body 2.

A power cable, a control cable, a signal cable, and the like, which are not illustrated in the drawing, are inserted into the connection unit 4. The light projecting and receiving unit 6 includes a light emitting element 10 and a light receiving element 20.

The display operation unit 50 includes an indicator 51 that is arranged on one side surface on a short side of the case body 2, a first operation button 52 and a second operation button 53 that are arranged on an upper oblique surface of the case body 2, and a third operation button 54, a first display lamp 55, and a second display lamp 56 that are arranged on an upper surface of the case body 2.

Functions assigned to the first operation button 52, the second operation button 53, and the third operation button 54, information indicated by the first display lamp 55 and the second display lamp 56, and the like can be arbitrarily designed.

B. Outline of Displacement Sensor of TOF Method

Next, an outline of a displacement sensor of the TOF method will be described. The displacement sensor 1 according to the embodiment employs a binary method (pulse method), which is an example of the TOF method. In the binary method, pulse signals are emitted to an object, reflection signals generated through reflection from the object are statistically processed, and a portion corresponding to an edge (a rising portion and/or a falling portion) of the emitted pulse signals is specified, whereby displacement to the object is measured.

Although a case in which light is used as a medium of the pulse signals will be exemplified in the following description, the medium is not limited thereto, and sound waves or another signal medium may be used.

Figure 2:
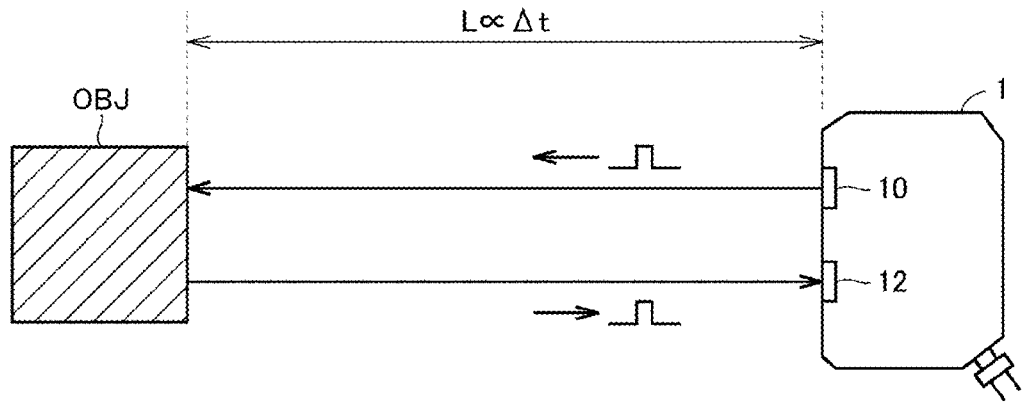

FIG. 2 is a schematic diagram for describing an outline of displacement measurement using the displacement sensor 1 according to the embodiment. Referring to FIG. 2, the displacement sensor 1 emits pulse signals (hereinafter, also referred to as "emitted pulses") from the light emitting element 10 to an object OBJ. Light generated from the emitted pulses reflected by the object OBJ is received by the light receiving element 20.

A time difference Δt occurring between the emitted pulses and the reflection signals is proportional to a distance L between the displacement sensor 1 and the object OBJ. Therefore, it is possible to calculate the distance L from the displacement sensor 1 to the object OBJ by measuring the time difference Δt.

Meanwhile, since the time difference Δt corresponds to a value obtained by dividing double the distance L from the displacement sensor 1 to the object OBJ by the speed of light, the time difference Δt is significantly short. Therefore, the time difference Δt (distance L) is statistically determined on the basis of a group of results obtained by emitting the emitted pulses several times by utilizing a time-to-digital converter (TDC) delay line, to which a plurality of delay elements are connected in series in multiple stages, as will be described later.

Figure 3:
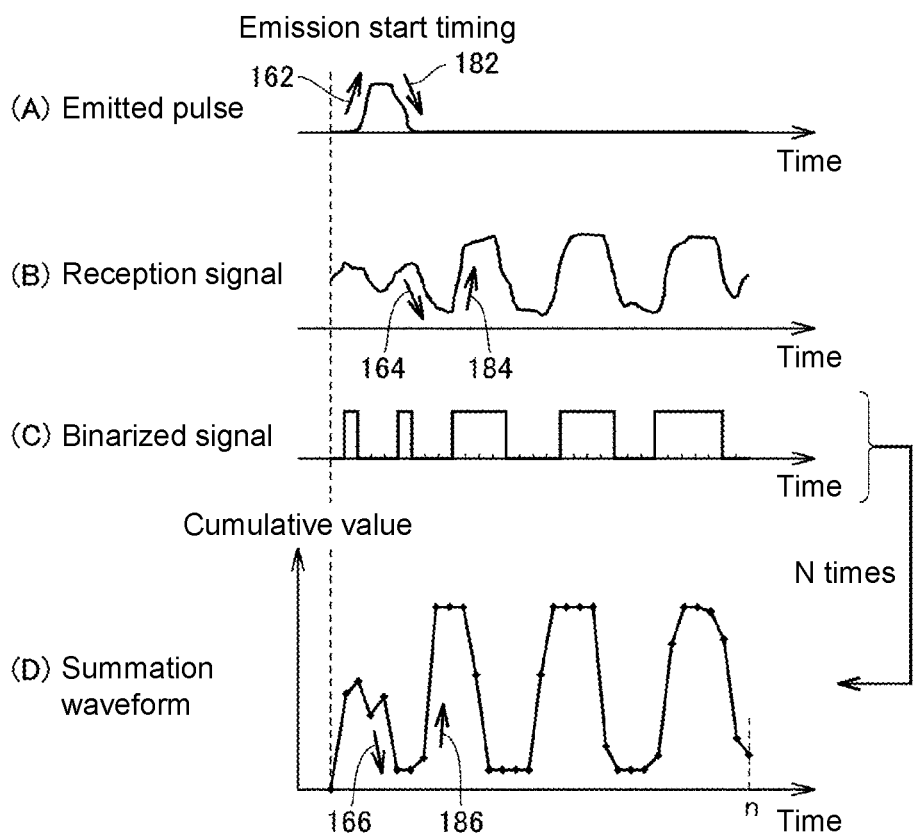

(A) to (D) of FIG. 3 are schematic diagrams for generally describing processing of displacement measurement using the displacement sensor 1 according to the embodiment. (A) of FIG. 3 illustrates an example of a temporal waveform of an emitted pulse emitted from the light emitting element 10. (B) of FIG. 3 illustrates an example of a temporal waveform of a signal (hereinafter, also referred to as a "reception signal") generated by the emitted pulse being reflected by the object OBJ and being then incident on the light receiving element 20.

A rising portion 162 and a falling portion 182 of the emitted pulse appear in the temporal waveform illustrated in (A) of FIG. 3, and a falling portion 164 and a rising portion 184, which correspond to the rising portion 162 and the falling portion 182 of the emitted pulse, respectively, also appear in the reception signal illustrated in (B) of FIG. 3. Note that an intensity direction of the emitted pulse is inverted in the reception signal illustrated in (B) of FIG. 3 for convenience of signal processing. A temporal waveform of a plurality of pulses appears in the reception signal.

The reception signal illustrated in (B) of FIG. 3 is binarized in a predefined sampling period. (C) of FIG. 3 illustrates an example of a temporal waveform of the binarized reception signal (hereinafter, also referred to as a "binary signal").

The binary signal illustrated in (C) of FIG. 3 is accumulated a plurality of times with reference to a common time reference (an emission start timing illustrated in (A) of FIG. 3). That is, the emitted pulse illustrated in (A) of FIG. 3 is emitted to the object OBJ in every measurement period, and the respective binary signals generated by the emission of the respective emitted pulses are summed on a time axis with reference to the respective emission start timings. (D) of FIG. 3 illustrates an example of a result of signal summation.

Each of binary signals becomes "1" for a section in which a corresponding reception signal exceeds a predefined signal intensity and becomes "0" for the other sections. If such binary signals are summed N times, a section with a high probability of the signal intensity being "1" in the binary signals corresponding to N times exhibits a value that is close to "N", and other sections exhibit a value that is close to "0". In (D) of FIG. 3, the cumulative value corresponds to the probability indicating how many times corresponding sections exhibit "1" in the signal summation performed N times.

The reflection signals generated from the object OBJ through the emission of the emitted pulses are statistically processed through the signal summation performed N times as described above. As a result, a falling portion 166 and a rising portion 186, which correspond to the rising portion 162 and the falling portion 182 of the emitted pulses, respectively, and correspond to the distance from the displacement sensor 1 to the object OBJ can be specified as illustrated in (D) of FIG. 3.

Finally, the distance between the displacement sensor 1 and the object OBJ can be measured on the basis of the time difference between the rising portion 162 of the emitted pulses and the falling portion 166 in the summation waveform or the time difference between the falling portion 182 of the emitted pulse and the rising portion 186 in the summation waveform.

C. Hardware Configuration of Displacement Sensor

Figure 4:
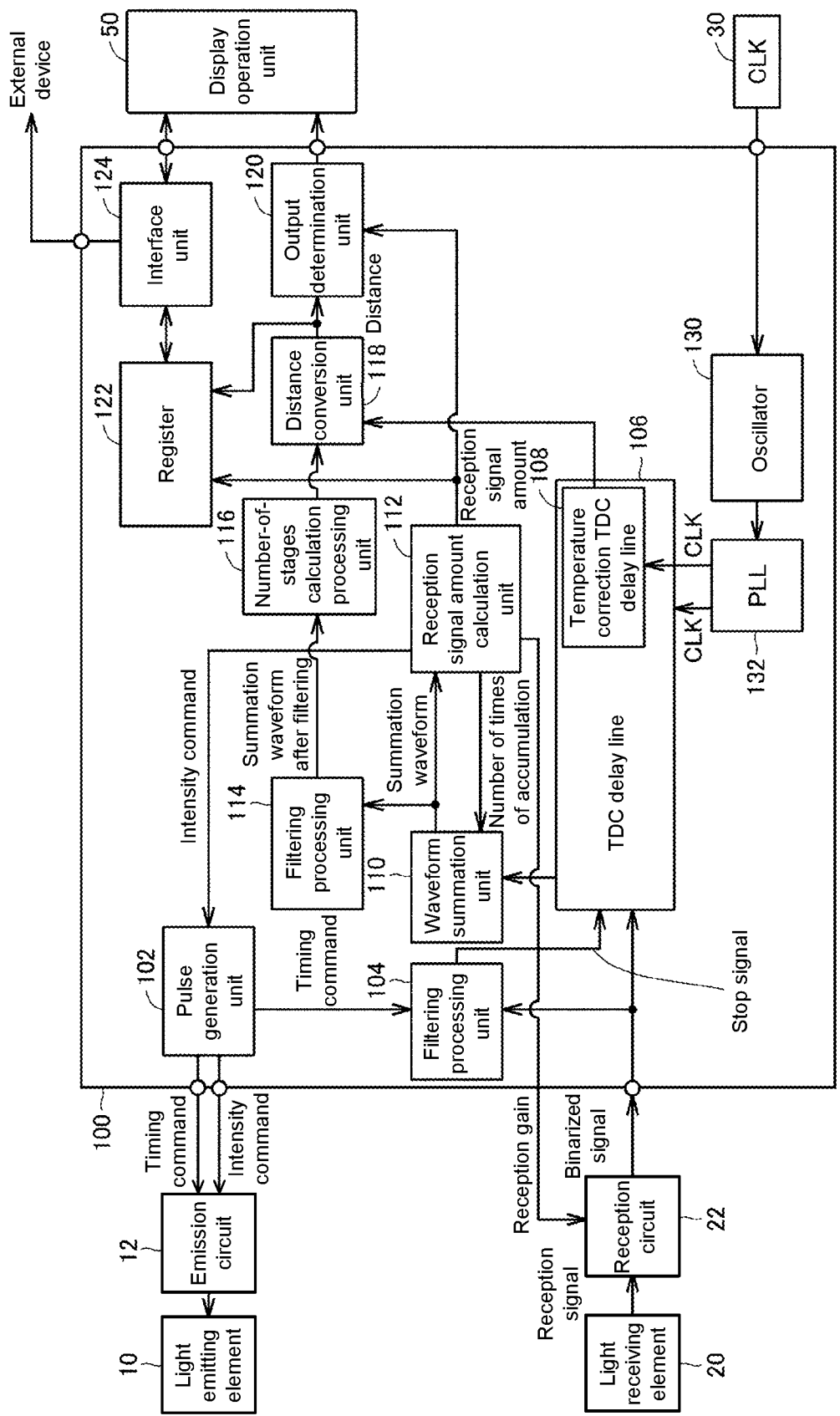

Next, an example of a hardware configuration of the displacement sensor 1 according to the embodiment will be described. FIG. 4 is a schematic diagram illustrating an example of the hardware configuration of the displacement sensor 1 according to the embodiment. Referring to FIG. 4, the displacement sensor 1 includes a main processing unit 100, the light emitting element 10, an emission circuit 12, the light receiving element 20, a reception circuit 22, an external clock 30, and a display operation unit 50.

The light emitting element 10 and the emission circuit 12 function as an emitting unit that periodically emits emitted pulses to the object OBJ. The light emitting element 10 is formed by a semiconductor light emitting device such as a light emitting diode (LED) or a laser diode (LD), for example. The emission circuit 12 supplies electric power for driving the light emitting element 10 in response to a command (a timing command and an intensity command) from the main processing unit 100.

The light receiving element 20 and the reception circuit 22 function as a receiving unit for receiving reflection signals from the object OBJ. The light receiving element 20 receives reflection signals generated by the emitted pulse from the light emitting element 10 being reflected by the object OBJ. The light receiving element 20 is formed by a semiconductor light receiving device such as a photodiode (PD), for example. The reception circuit 22 outputs binary signals obtained by binarizing the reception signals output from the light receiving element 20. In this manner, the receiving unit including the light receiving element 20 and the reception circuit 22 receives the reflection signals generated by the emitted pulses emitted from the emitting unit (the light emitting element 10 and the emission circuit 12) being reflected by the object OBJ and outputs the binary signals indicating the signal intensity of the received reflection signals.

The main processing unit 100 is a portion that is in charge of main processing in the displacement sensor 1 and is typically formed by a circuit realized by hardware, such as a field-programmable gate array (FPGA) or an application specific integrated circuit (ASIC). However, at least a part thereof may be realized by software implementation. That is, processing and functions as will be described later may be realized by an arbitrary processor executing programs.

The main processing unit 100 outputs a timing command for providing an instruction for starting emission of an emitted pulse and an intensity command for providing an instruction regarding an intensity of the emitted pulse to the emitting unit (the light emitting element 10 and the emission circuit 12), and a binary signal is input to the main processing unit 100 from the receiving unit (the light receiving element 20 and the reception circuit 22). The main processing unit 100 outputs processing results and the like to the display operation unit 50 and receives information indicating user operations performed on the display operation unit 50.

More specifically, the main processing unit 100 includes a pulse generation unit 102, a counter measurement unit 104, a TDC delay line 106, a temperature correction TDC delay line 108, a waveform summation unit 110, a reception signal amount calculation unit 112, a filtering processing unit 114, a number-of-stages calculation processing unit 116, a distance conversion unit 118, an output determination unit 120, a register 122, an interface unit 124, a phase locked loop (PLL) 132, and an oscillator 130.

FIG. 4 illustrates a configuration example in which displacement (the distance from the displacement sensor 1 to the object OBJ) is calculated in two stages, namely rough measurement and fine measurement in one example.

The pulse generation unit 102 outputs commands related to an emission period (measurement period) and intensity (an amplitude of an emitted pulse) of an emitted pulse to the emission circuit 12. The pulse generation unit 102 decides the intensity of the emitted pulse in accordance with the intensity command from the reception signal amount calculation unit 112 and also outputs a timing command indicating an emission period (measurement period) of the emitted pulse to the counter measurement unit 104.

The counter measurement unit 104 is a circuit that is in charge of the rough measurement, stores the change over time in the binary signals from the reception circuit 22 (hereinafter, also referred to as "temporal waveforms" for convenience of description) in a predetermined period and accumulates the temporal waveforms in the predetermined period a plurality of number of times, thereby calculating the time difference generated between the emitted pulse and the reflection signal.

The TDC delay line 106, the temperature correction TDC delay line 108, the waveform summation unit 110, the filtering processing unit 114, the number-of-stages calculation processing unit 116, and the distance conversion unit 118 are circuits that are in charge of the fine measurement.

The TDC delay line 106 includes a plurality of delay elements that are connected in series in multiple stages (that is, a group of delay elements in a plurality of stages), holds temporary waveforms of the binary signals from the reception circuit 22 in a predetermined period, and outputs the temporal waveforms held in the predetermined period to the waveform summation unit 110.

The temperature correction TDC delay line 108 is a circuit for acquiring information for correcting variation (mainly due to temperature) in a delay time occurring between the respective delay elements that form the TDC delay line 106 and includes a plurality of delay elements that are connected in series in multiple stages (that is, a group of delay elements in a plurality of stages) similarly to the TDC delay line 106. The temperature correction TDC delay line 108 is activated in a predefined period. A delay time occurring in one delay element is calculated on the basis of a relationship between the number of stages of the delay element activated at that time and the predefined period.

The waveform summation unit 110 generates a summation waveform by accumulating the temporal waveforms in the predetermined period, which are held in the TDC delay line 106, a plurality of times and outputs the summation waveform to the reception signal amount calculation unit 112 and the filtering processing unit 114. That is, the waveform summation unit 110 generates the summation waveform by accumulating a plurality of temporal waveforms of the binary signals generated or the plurality of emitted pulses for the respective corresponding times with reference to the emission timings of the corresponding emitted pulses as a common reference. The summation waveform corresponds to a kind of histogram indicating a probability at which the binary signals are on in the respective periods of time.

The filtering processing unit 114 performs filtering processing on the summation waveform from the waveform summation unit 110 and then outputs the summation waveform after the filtering to the number-of-stages calculation processing unit 116. That is, the filtering processing unit 114 performs the filtering processing on the summation waveform that is generated by the waveform summation unit 110.

The number-of-stages calculation processing unit 116 calculates the number of stages of the delay elements, which corresponds to a time difference occurring between the emitted pulses and the reflection signals, on the basis of the summation waveforms after the filtering from the filtering processing unit 114.

The distance conversion unit 118 calculates a period of time until a feature point appears in the reflection signals after the emitted pulses are emitted, on the basis of the number of stages from the number-of-stages calculation processing unit 116 and a delay time occurring in a delay element from the temperature correction TDC delay line 108 and finally calculates the distance (displacement) from the displacement sensor 1 to the object OBJ.

The number-of-stages calculation unit 116 and the distance conversion unit 118 function as a distance calculation unit that calculates a value indicating the distance to the object OBJ on the basis of a waveform feature corresponding to a waveform feature (an edge of the emitted pulses (a rising portion and/or a falling portion) of the emitted pulses, which appears in the summation waveform.

The distance from the displacement sensor 1 to the object OBJ is calculated by the aforementioned function.

The reception signal amount calculation unit 112 calculates a reception signal amount (intensity of the reception signals caused by the reflection signals), which is intensity of the reflection signals received by the receiving unit (the light receiving element 20 and the reception circuit 22) on the basis of the feature amounts indicated by one or a plurality of cumulative values that appear in the summation waveform. The calculated reception signal amount (the reception signal amount) corresponds to a signal-to-noise (S/N) ratio in the measurement state, and it is possible to evaluate that measurement stability is higher and measurement resolution is also higher when the reception signal amount is larger. Details of the processing of calculating the reception signal amount using the reception signal amount calculation unit 112 will be described later.

The output determination unit 120 determines whether or not the distance calculated by the distance conversion unit 118 satisfies a predefined condition and outputs the determination result to the display operation unit 50. A signal indicating detection of the object OBJ may typically be output in a case in which the distance from the displacement sensor 1 to the object OBJ is equal to or less than a predefined value. The output determination unit 120 typically determines whether or not the object OBJ is present on the basis of the value indicating the distance calculated by the distance calculation unit (the number-of-stages calculation processing unit 116 and the distance conversion unit 118).

The register 122 temporarily stores the distance from the distance conversion unit 118 and the reception signal amount from the reception signal amount calculation unit 112 and outputs the distance and the reception signal amount to the interface unit 124. The interface unit 124 successively updates the display of the indicator 51 (see FIG. 1 and the like) of the display operation unit 50 on the basis of the values or the like stored in the register 122.

The external clock 30 generates a reference clock for driving the respective parts in the main processing unit 100. A quartz oscillator, for example, may be used as the external clock 30. The oscillator 130 generates an internal clock in accordance with a reference clock from the external clock 30. The internal clock from the oscillator 130 is given to the PLL 132.

The PLL 132 supplies the measurement clock for driving the TDC delay line 106 and the temperature correction TDC delay line 108 and the respective parts that form the main processing unit 100 in accordance with the internal clock from the oscillator 130.

Since the display operation unit 50 has been described above with reference to FIG. 1, detailed description will not be repeated.

D. Outline of Measurement Processing

Next, details of two-stage measurement (rough measurement and fine measurement) using the displacement sensor 1 according to the embodiment will be described.

(d1: Rough Measurement: Counter Measurement Unit 104)

The rough measurement using the displacement sensor 1 according to the embodiment is executed by the counter measurement unit 104. The counter measurement unit 104 collects the binary signals in association with times on the basis of clocks obtained by shifting phases of the measurement clock CLK and the measurement clock CLK. The temporal waveforms of the collected binary signals are measured for a plurality of emission periods (measurement periods). The temporal waveforms are measured a predetermined number of times (corresponding to n samples, for example), and binarization information for the respective corresponding times (sampling timings) is accumulated among the plurality of respectively measured temporal waveforms. That is, since the binarization information corresponding to N times is obtained at the respective sampling timings if the temporal waveforms of the binarization information are measured N times, it is possible to calculate the summation waveform by accumulating the binarization information corresponding to N times for the respective sampling timings.

Figure 5:
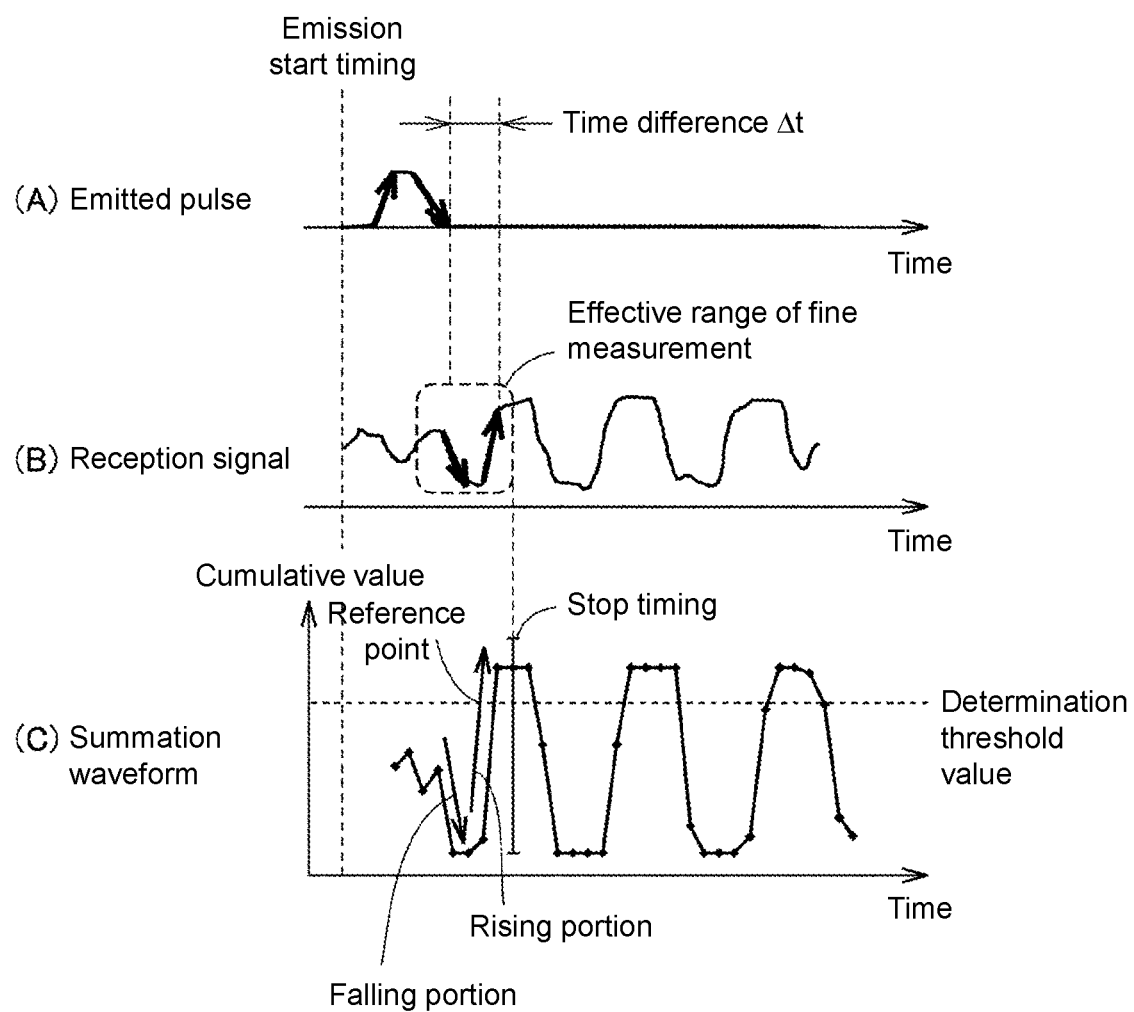

(A) to (C) of FIG. 5 are schematic diagrams for describing processing content of the rough measurement using the displacement sensor 1 according to the embodiment. (A) of FIG. 5 illustrates an example of a temporal waveform of an emitted pulse, and (B) of FIG. 5 illustrates an example of a temporal waveform of a reflection signal generated by the emitted pulse illustrated in (A) of FIG. 5 being reflected by the object OBJ. (B) of FIG. 5 illustrates a temporal waveform (a state before the binarization processing) of intensity of a signal output from the light receiving element 20.

As illustrated in FIG. 5, a time difference occurring between the emitted pulse and the reflection signal is measured by the displacement sensor 1 according to the embodiment. The counter measurement unit 104 decides a timing for setting an effective range of the fine measurement (a timing at which an operation of shifting to the TDC delay line 106 is stopped). That is, the counter measurement unit 104 decides the stop timing of the TDC delay line 106, which is used in the fine measurement.

(C) of FIG. 5 illustrates an example of a summation waveform obtained by accumulating binary signals corresponding to N times. For example, a crossing point (reference point) between a waveform edge in the summation waveform corresponding to a rising portion of an emitted pulse and a determination threshold value may be calculated, and the stop timing for the TDC delay line 106 may be decided from the calculated reference point. (C) of FIG. 5 illustrates an example in which a sampling timing following the crossing point (reference point) between the waveform edge and the determination threshold value is decided as a stop timing.

Note that a crossing point between a waveform edge corresponding to the falling portion of the summation waveform and the determination threshold may be used as a reference point. Further, a feature point (for example, a maximum value, a minimum value, a local maximum, a local minimum, or the like) included in the summation waveform may be used.

The aforementioned rough measurement is executed prior to the fine measurement, and the stop timing for the TDC delay line 106, which is used in the following fine measurement in the measurement period, is decided by measuring the temporal waveforms of the binary signals corresponding to N times.

(d2: Fine Measurement: TDC Delay Line 106 and Waveform Summation Unit 110)

The fine measurement using the displacement sensor 1 according to the embodiment is executed mainly by the TDC delay line 106 and the waveform summation unit 110. The TDC delay line 106 inputs the input binary signals to the delay elements that are connected in series in multiple stages and collectively takes values of the respective delay elements at the same timing in accordance with stop signals indicating the stop timings decided by the counter measurement unit 104, thereby obtaining waveform data of the binarization information.

The waveform summation unit 110 accumulates the binarization information for the corresponding number of stages (the positions of the delay elements) by accumulating the waveform data of the binarization information M times. That is, since the waveform summation unit 110 can obtain the binarization information corresponding to M times for each number of stages if the waveform summation unit 110 obtains the waveform data of the binarization information M times, it is possible to calculate the summation waveform by accumulating the binarization information (M pieces) for the same number of stages.

Figure 6:
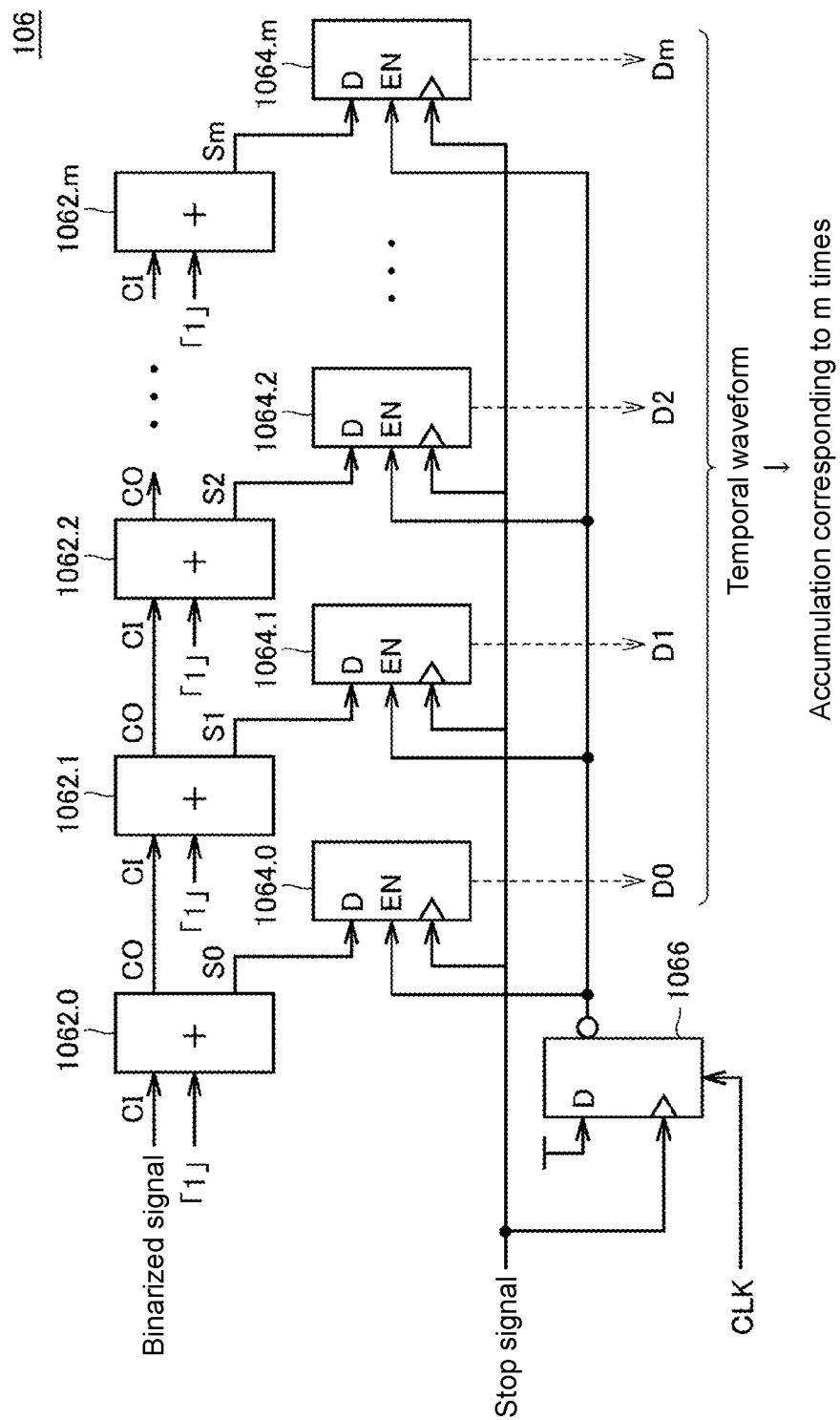
FIG. 6 is a schematic diagram for describing processing content of fine measurement using the displacement sensor according to the embodiment.

FIG. 6 is a schematic diagram for describing processing content of the fine measurement using the displacement sensor 1 according to the embodiment. Referring to FIG. 6, the TDC delay line 106 includes a delay circuits 1062.0 to 1062.$m$ that are connected in series in multiple stages, D flip-flops 1064.0 to 1064.$m$ that are linked to the delay circuits 1062.0 to 1062.$m$, respectively, and a flip-flop 1066.

In the TDC delay line 106, a binary signal is input to a first input port (CI) of the delay circuit 1062.0. "1" (true) is input to the second input port of each of the delay circuits 1062.0 to 1062.$m$. As a result, the value input to the first input port (CI) is output with no change from the output port (CO) of the delay circuit 1062.0. However, a delay time required to cause an internal state of the delay circuit 1062.0 to change occurs after a value is input to the first input port (CI) of the delay circuit 1062.0 until the value is output from the output port (CO). That is, a delay time corresponding to an operation time of the delay circuit 1062.0 is added to the binary signal input to the delay circuit 1062.0.

Since the delay time is similarly added to each of the delay circuits 1062.1 to 1062.*m* in order, the respective values output from the output ports (CO) of the delay circuits 1062.0 to 1062.*m* correspond to values obtained by deviation of the temporal waveforms of the binary signals input to the TDC delay line 106 by the delay times in accordance with the number of stages and samplings of the deviated temporal waveforms. In this manner, each of the delay circuits 1062.1 to 1062.*m* corresponds to a delay element.

The D flip-flops 1064.0 to 1064.*m* correspond to circuits that latch the values output from the output ports (CO) of the delay circuits 1062.0 to 1062.*m*, respectively, in accordance with the stop signals. More specifically, value respectively output from result output ports (S0 to Sm) of the delay circuits 1062.0 to 1062.*m* are input to D ports of the D flip-flops 1064.0 to 1064.*m*.

Inverted outputs of the flip-flop 1066 are given to the activated ports (EN) of the D flip-flops 1064.0 to 1064.*m*. Also, stop signals from the counter measurement unit 104 are input to the trigger ports of the D flip-flops 1064.0 to 1064.*m*. The D flip-flops 1064.0 to 1064.*m* are edge trigger types and are activated at timings at which changes occur in the stop signals, that is, at timings at which the stop signals are output from the counter measurement unit 104.

In addition, the flip-flop 1066 is driven by the measurement clock CLK, and the stop signals from the counter measurement unit 104 are input to the trigger ports. The flip-flop 1066 is a flip-flop of an edge trigger type.

In a circuit configuration as illustrated in FIG. 6, binary signals are input before the stop signals from the counter measurement unit 104 are input, and values at waveform positions sequentially deviating by the delay times occurring in the delay circuits 1062.0 to 1062.*m* are held and updated. Also, the flip-flop 1066 is in an inactivated state, and "1" (true) has been given to the activated ports (EN) of the D flip-flops 1064.0 to 1064.*m* as the inverted outputs of the flip-flop 1066.

Here, if the stop signals from the counter measurement unit 104 are input, the D flip-flops 1064.0 to 1064.*m* are activated, and the D flip-flops 1064.0 to 1064.*m* take values output from the result output ports (S0 to Sm) of the delay circuits 1062.0 to 1062.*m*.

Then, the flip-flop 1066 is activated, and "0" (false) is given to the activated ports (EN) of the D flip-flops 1064.0 to 1064.*m* as inverted outputs of the flip-flop 1066. In this manner, taking of the values from the result output ports (S0 to Sm) of the delay circuits 1062.0 to 1062.*m* is invalidated at the D flip-flops 1064.0 to 1064.*m*. Further, the D flip-flops 1064.0 to 1064.*m* are inactivated.

Values D0 to Dm held by the delay circuits 1062.0 to 1062.*m* at the timings at which the stop signals are input from the counter measurement unit 104 are taken by such a series of operations. Waveform data of the binarization information including the values D0 to DM is acquired. Such waveform data of the binarization information corresponding to M times is output to the waveform summation unit 110.

The waveform summation unit 110 accumulates the waveform data of the binarization information corresponding to M times and generates the summation waveform.

Figure 7:
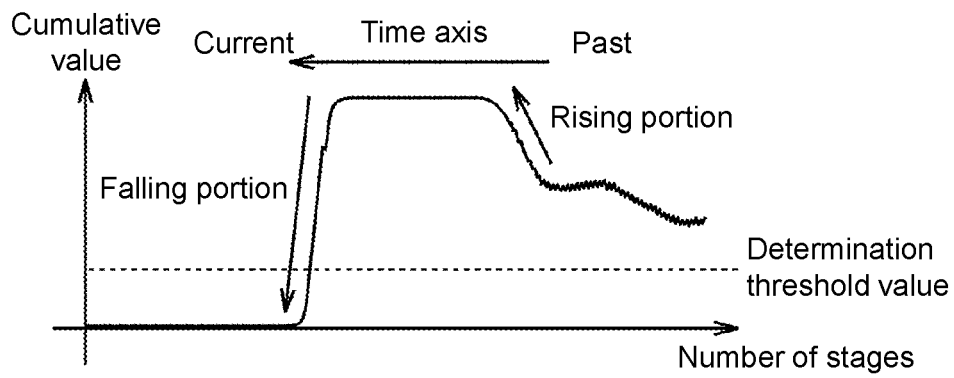
FIG. 7 is a diagram illustrating an example of a summation waveform generated through the fine measurement using the displacement sensor according to the embodiment.

FIG. 7 is a diagram illustrating an example of the summation waveform generated through the fine measurement using the displacement sensor 1 according to the embodiment. Referring to FIG. 7, cumulative values are calculated for the number of respective stages of the delay circuits 1062.1 to 1062.*m* (that is, the D flip-flops 1064.0 to 1064.*m*). Note that since the delay times increase as the number of stages increases, the right side of the waveform illustrated in FIG. 7 indicates a value at an older timing. That is, a time axis of the binary signals is the opposite to that illustrated in FIG. 5, the right side represents the past side, and the left side represents the current side. In this manner, a smaller number of stages indicates a temporally later (longer distance) waveform. As a result, the rising portion of the emitted pulses occurs on the right side in the sheet surface while the falling portion of the emitted pulse occurs on the left side in the sheet surface as illustrated in FIG. 7.

The distance from the displacement sensor 1 to the object OBJ is calculated from the number of stages corresponding to the crossing point between the waveform edge in the summation waveform, which corresponds to the rising portion of the emitted pulses, for example, and the determination threshold value.

Note that since the processing of calculating the number of stages in the TDC delay line 106 is executed after the filtering processing, the processing is not executed by the waveform summation unit 110 in the displacement sensor 1 according to the embodiment.

In the fine measurement using the displacement sensor 1 according to the embodiment, values of the respective parts of the binary signals are taken at the same timing on the basis of stop timings at which the binary signals input to the TDC delay line 106 are decided by the counter measurement unit 104 (rough measurement) as described above. Such taking of the values of the respective parts is repeatedly executed in a plurality of measurement periods until a predetermined number of times of accumulation (M time) is reached, and the taken binarization information is accumulated M times for the respective periods of time (the number of stages). In this manner, the summation waveform can be calculated.

Note that although FIG. 6 illustrates a configuration example in which an array of delay elements connected in series in multiple stages is present only in one line for convenience of description, a plurality of arrays of delay elements connected in series in multiple stages may be arranged. In this case, the binary signals are input in parallel to the respective arrays of the delay elements. The waveform summation unit 110 accumulates the waveform data taken from the respective arrays of the delay elements. That is, in a case in which the TDC delay line 106 includes a group of delay elements in a plurality of lines, summation results of all the lines are summed.

Note that although FIG. 6 exemplifies the configuration in which the delay circuits 1062.0 to 1062.*m* are used as the delay elements, the configuration is not limited thereto, and arbitrary elements can be utilized as the delay elements. Inverter circuits, flop-flop circuits, or the like may typically be used. That is, any circuits may be caused to function as the delay elements as long as at least one gate is present in the circuits.

(d3: Filtering Processing Unit 114 and Number-of-Stages Calculation Processing Unit 116)

Next, filtering processing and number-of-stages calculation processing performed on the summation waveform acquired through the fine measurement will be described.

The filtering processing unit 114 executes filtering processing on the summation waveform acquired by the waveform summation unit 110. The filtering processing is performed for the purpose of improving accuracy by reducing noise.

(A) and (B) of FIG. 8 are schematic diagrams for describing processing content of the filtering processing using the displacement sensor 1 according to the embodiment. (A) of FIG. 8 illustrates an example of a filter that is used in the filtering processing. The filter illustrated in (A) of FIG. 8 is a kind of weighted moving average filter and calculates a value of a target point by applying a weight to a specific value in the vicinity of the target point and then performing summation.

(B) of FIG. 8 illustrates an example of the filtering processing. The value of the specific target point is calculated by applying a weight to a value in the vicinity of the target point and performing summation.

The filter illustrated in (A) of FIG. 8 applies a weight to values in a region in a vicinity of ±7 around the target point and then performs summation. The filter illustrated in (A) of FIG. 8 calculates an average value in a region in a vicinity of ±7 by setting all the weights to "1". That is, it is possible to use the filter as a smoothing filter by setting all the weights to "1".

FIG. 9 is a diagram illustrating an example of a summation waveform obtained through the filtering processing using the displacement sensor 1 according to the embodiment. FIG. 9 illustrates an example of a waveform obtained in a case in which all the weights are set to "1" in the filter illustrated in (A) of FIG. 8. As illustrated in FIG. 9, it is possible to ascertain that the amplitude of the summation waveform is amplified and also noise components included in the rising portion are reduced by executing the filtering processing.

Note that resolution in the time direction (number-of-stages direction) may be improved by performing interpolation processing on the calculated summation waveform instead of or in addition to the filtering processing performed by the filtering processing unit 114.

The number-of-stages calculation processing unit 116 calculates the number of stages for calculating the time difference Δt occurring between the emitted pulses and the reflection signals by searching for feature points included in the summation waveform after the filtering processing as illustrated in FIG. 9.

FIG. 9 illustrates processing of calculating the number of stages on the basis of the crossing point between the falling portion of the summation waveform, which corresponds to the falling portion that is an edge of the emitted pulses, and the determination threshold value. Note that the number of stages is calculated from the left side on the sheet surface. Note that a feature point (for example, a maximum value, a minimum value, a local maximum, a local minimum, or the like) included in the summation waveform may be used.

In this manner, the filtering processing unit 114 regards the summation waveform generated by summing the entire waveform data of the binarization information, which is taken by the TDC delay line 106, as a target. In a case in which the TDC delay line 106 has two lines of delay elements that are connected in series in multiple stages, and in a case in which the number of times of accumulation (corresponding to M times as described above) per line is 1024 times, for example, it is possible to generate a summation waveform through a total of 2048 times of accumulation for the two lines.

Note that the width and the weight of the filter used by the filtering processing unit 114 are arbitrarily set in advance. Alternatively, the width and the weight thereof may be dynamically set in accordance with situations.

Eventually, the number-of-stages calculation processing unit 116 decides the crossing point from the summation waveform after the filtering, which is output from the filtering processing unit 114, and calculates the number of stages.

(d4: Distance Conversion Unit 118 and Temperature Correction TDC Delay Line 108)

The distance conversion unit 118 calculates the time difference Δt occurring between the emitted pulses and the reflection signals, that is, the distance L between the displacement sensor 1 and the object OBJ by multiplying the number of stages calculated by the number-of-stages calculation processing unit 116 by the delay time occurring per delay element. The delay time occurring per delay element is calculated by using the temperature correction TDC delay line 108.

The temperature correction TDC delay line 108 includes delay elements that are similar to the delay elements that form the TDC delay line 106. The TDC delay line 106 and the temperature correction TDC delay line 108 are preferably formed on a common substrate or semiconductor such that the temperature correction TDC delay line 108 is subjected to the same temperature conditions as those of the TDC delay line 106.

Processing of activating the temperature correction TDC delay line 108 during a known period is repeatedly executed. The delay time per delay element can be calculated from the period during which the temperature correction TDC delay line 108 is activated and the number of stages of the delay elements activated during the period.

In this manner, the distance conversion unit 118 calculates the time difference Δt occurring between the emitted pulses and the reflection signals, that is, the distance L between the displacement sensor 1 and the object OBJ according to the number of stages calculated by the number-of-stages calculation processing unit 116.

(d5: Output Determination Unit 120)

The output determination unit 120 outputs a determination result of ON/OFF (or detection/non-detection) according to a case in which the calculated distance L exceeds a threshold value when comparing the distance L between the displacement sensor 1 and the object OBJ calculated by the distance conversion unit 118 with a predefined threshold value, and a case in which the calculated distance L is less than the threshold value. Lighting states of the indicator 51, the first display lamp 55, and the second display lamp 56 arranged on the case body 2 may be caused to change in accordance with the determination result from the output determination unit 120.

Hysteresis within a predetermined range may be set in addition to the threshold value such that variation (so-called chattering) does not occur in the determination result from the output determination unit 120 in a short period of time.

FIG. 10 is a diagram for describing an example of the hysteresis set in the output determination unit in the displacement sensor 1 according to the embodiment. Referring to FIG. 10, a case in which "ON" that means presence of the object OBJ is output if the calculated distance is less than a preset threshold value may be taken, for example.

As illustrated in FIG. 10, "ON" is output as the determination result if the calculated distance is less than the threshold value. The output of "ON" is continued even if the calculated distance becomes greater than the threshold value thereafter, and the output of "ON" is released in a case in which the calculated distance exceeds the threshold value by a predetermined width (hysteresis).

In this manner, it is possible to prevent a state in which the determination output intermittently changes even if the calculated distance varies, by setting the hysteresis relative to the present threshold value.

E. Processing of Calculating Reception Signal Amount

Next, details of the processing of calculating the reception signal amount using the reception signal amount calculation unit 112 in the displacement sensor 1 according to the embodiment will be described. According to the conventional binary method (pulse method), it is not possible to measure the reception signal amount, that is, the intensity of the reflection signals generated by the emitted pulses from the light emitting element 10 being reflected by the object OBJ. This is because the reflection signals are binarized.

In contrast, the displacement sensor 1 according to the embodiment measures or estimates the intensity of the reflection signals of the emitted pulses from the object OBJ (the reception signal amount) and realizes a suitable measurement state through adjustment of the intensity of the emitted pulse on the basis of the result obtained by the measurement or the estimation. More specifically, the reception signal amount calculation unit 112 calculates feature amounts indicated by one or a plurality of cumulative values from the summation waveform output from the waveform summation unit 110 or the summation waveform after the filtering, which is output from the filtering processing unit 114.

Hereinafter, some methods for the processing of calculating the reception signal amount based on the feature amounts indicated by one or a plurality of cumulative values will be described.

(e1: Method Utilizing Inclination of Summation Waveform: Part 1)

First, a method of calculating the reception signal amount by utilizing an inclination that appears in a summation waveform as a feature amount indicated by one or a plurality of cumulative values will be described.

FIG. 11 is a diagram for describing a method of calculating the reception signal amount on the basis of an inclination of the summation waveform by using the displacement sensor 1 according to the embodiment. Referring to FIG. 11, attention will be paid to a waveform edge in the summation waveform output from the waveform summation unit 110 or the summation waveform after the filtering, which is output from the filtering processing unit 114. Note that although processing, which will be described later, may be performed on the summation waveform output from the waveform summation unit 110, more stable processing can be realized by using the summation waveform after the filtering, which is output from the filtering processing unit 114.

FIG. 11 illustrates a method of calculating an inclination of the waveform edge in the summation waveform (the amount of change in the cumulative value with respect to a period of time) as an example of the inclination of the summation waveform. The inclination of the waveform edge in the summation waveform corresponds to an inclination of a region corresponding to the rising portion or the falling portion of the emitted pulses, and the reception signal amount is calculated on the basis of the magnitude of the inclination.

In a specific procedure for calculating the inclination of the waveform edge in the summation waveform, a crossing point (reference point) between the waveform edge in the summation waveform and a determination threshold value is calculated, and crossing points 201 and 202 with a higher threshold value for calculating an inclination and a lower threshold value for calculating an inclination are respectively decided in a front-back direction on the time axis (number-of-stages axis) with respect to the reference point.

The inclination of the waveform edge in the summation waveform is calculated on the basis of coordinate positions of the crossing point 201 and the crossing point 202. That is, it is possible to calculate the inclination of the waveform edge in the summation waveform=(a difference between the cumulative value corresponding to the crossing point 201 and the cumulative value corresponding to the crossing point 202)/(a difference between a time corresponding to the crossing point 201 and a time corresponding to the crossing point 202).

It is possible to determine that the reception amount signal is larger as the inclination of the waveform edge in the summation waveform, which is calculated in this manner, is steeper. Therefore, it is possible to calculate the reception signal amount by multiplying the calculated magnitude of the inclination by a constant coefficient. Alternatively, the reception signal amount may be calculated by using a multidimensional function that includes the calculated inclination as a variable. Further, it is possible to decide the reception signal amount corresponding to the calculated inclination by referring to a table that predefines a relationship between the magnitude of the inclination and the reception signal amount.

It s possible to calculate the intensity of the reflection signals received by the displacement sensor 1, that is, the reception signal amount through the processing procedure as described above. In a case in which the calculated reception signal amount is outside a predefined appropriate range, processing of appropriately adjusting the measurement state, which will be described later, may be executed.

(e2: Method of Utilizing Inclination of Summation Waveform: Part 2)

The inclination that appears in the summation waveform as described above may be calculated by using a time width rather than a threshold value.

FIG. 12 is a diagram for describing another method of calculating the reception signal amount on the basis of the inclination of the summation waveform by using the displacement sensor 1 according to the embodiment. FIG. 12 illustrates another method of calculating the inclination of the waveform edge in the summation waveform (the amount of change in the cumulative values with respect to the time). In a specific procedure for calculating the inclination of the waveform edge in the summation waveform, a crossing point (reference point) between the waveform edge in the summation waveform and the determination threshold value is calculated, predetermined time widths (determination time) before and after the reference point on the time axis (number-of-stages axis) are respectively set, and the cumulative values with the respective determination time width are respectively decided as crossing points 203 and 204.

The inclination of the waveform edge in the summation waveform is calculated on the basis of coordinate positions of the crossing point 203 and the crossing point 204. That is, it is possible to calculate the inclination of the waveform edge in the summation waveform=(a difference between the cumulative value corresponding to the crossing point 203 and the cumulative value corresponding to the crossing point 204)/(2×the determination time).

It is possible to determine that the reception signal amount is larger as the inclination of the waveform edge in the summation waveform, which is calculated in this manner, is steeper. Therefore, it is possible to calculate the reception signal amount by multiplying the calculated magnitude of the inclination by a constant coefficient. Alternatively, the reception signal amount may be calculated by using a multidimensional function that includes the calculated magnitude of the inclination as a variable. Further, it is possible to decide the reception signal amount corresponding to the calculated inclination by referring to a table that predefines a relationship between the magnitude of the inclination and the reception signal amount.

It is possible to calculate the intensity of the reflected signals received by the displacement sensor 1, that is, the reception signal amount through the processing procedure as described above. In a case in which the calculated reception signal amount is outside the predefined proper range, processing of appropriately adjusting the measurement state, which will be described later, may be executed.

(e3: Method of Analytically Deciding Inclination of Summation Waveform)

Although the method of acquiring the feature amounts for calculating the reception signal amount from the summation waveform or the summation waveform after the filtering has been described above, such feature amounts may be analytically decided.

Specifically, a plurality of inclination curves that can be assumed for the summation waveform output from the waveform summation unit 110 or the summation waveform after the filtering, which is output from the filtering processing unit 114, may be defined, correlation values between the respective inclination curves and the summation waveform may be calculated, and an inclination curve indicating the highest correlation value may be decided, thereby calculating the reception signal amount corresponding to the decided inclination curve, for example.

In this case, the reception signal amount may be calculated on the basis of parameters that define the inclination curve, or a corresponding reception signal amount may be predefined for each inclination curve, and the reception signal amount corresponding to the inclination curve indicating the highest correlation value may be output.

(e4: Method of Utilizing Height Indicated by Summation Waveform: Part 1)

Next, a method of calculating the reception signal amount by utilizing a height indicated by the summation waveform (a magnitude of a cumulative value) as a feature amount indicated by one or a plurality of cumulative values will be described. At this time, the reception signal amount may be calculated on the basis of the magnitude in the cumulative direction associated with a predefined reference point (for example, a crossing point between the waveform edge in the summation waveform and the determination threshold value) that appears in the summation waveform.

In a specific procedure for calculating the height indicated by the summation waveform, the crossing point 203 or the crossing point 204 illustrated in FIG. 12 described above may be decided, and the reception signal amount may be calculated on the basis of the magnitude of the cumulative value at any of the decided crossing points. At this time, the cumulative value itself corresponding to the decided crossing point 203 or the crossing point 204 may be used, or a differential 205 or 206 between the cumulative value corresponding to each crossing point or the determination threshold value may be used.

The reception signal amount can be calculated by multiplying the cumulative value corresponding to the crossing point or the magnitude of the differential 205 or the differential 206 by a constant coefficient. Alternatively, the reception signal amount may be calculated by using a multidimensional function that includes the cumulative value corresponding to the crossing point or the magnitude of the differential 205 or the differential 206 as a variable. Further, it is possible to decide the reception signal amount corresponding to the calculated inclination by referring to a table that predefines a relationship between the cumulative value corresponding to the crossing point or the magnitude of the differential 205 or the differential 206 and the reception signal amount.

(e5: Method of Utilizing Height Indicated by Summation Waveform: Part 2)

Next, another method of calculating the reception signal amount by utilizing the height indicated by the summation waveform (the magnitude of the cumulative value) as the feature amounts indicated by one or a plurality of cumulative values will be described. At this time, the reception signal amount may be calculated on the basis of the magnitude in the cumulative direction associated with a predefined reference point (for example, a crossing point between the waveform edge in the summation waveform and a determination threshold value) that appears in the summation waveform.

In a specific procedure for calculating the height indicated by the summation waveform, the crossing point 203 and the crossing point 204 illustrated in FIG. 12 described above may be decided, and the reception signal amount may be calculated on the basis of a differential (an absolute value sum of the differential 205 and the differential 206) between any of the determined crossing points.

The reception signal amount can be calculated by multiplying the differential between the crossing points by a constant coefficient. Alternatively, the reception signal amount may be calculated by using a multidimensional function that includes the magnitude of the differential between the crossing points as a variable. Further, it is possible to decide the reception signal amount corresponding to the calculated inclination by referring to a table that predefines a relationship between the magnitude of the differential between the crossing points and the reception signal amount.

Note that a value with reference to a maximum value in the cumulative direction (for example, a level corresponding to ½ of the maximum value in the cumulative direction or the like) may be employed as the reference point.

(e6: Method of Utilizing Area Defined by Summation Waveform)

Next, a method of calculating the reception signal amount by utilizing an area defined by the summation waveform as feature amounts indicated by one or a plurality of cumulative values will be described. At this time, the reception signal amount may be calculated on the basis of the area defined by the summation waveform, which is associated with a predefined reference point (for example, a crossing point between the waveform edge in the summation waveform and a determination threshold value) that appears in the summation waveform.

FIG. 13 is a diagram for describing a method of calculating the reception signal amount on the basis of the area defined by the summation waveform by using the displacement sensor 1 according to the embodiment. FIG. 13 illustrates a method of calculating the area defined by the inclination of the waveform edge in the summation waveform. In a specific procedure for calculating the area defined by the summation waveform, the crossing point (reference point) between the waveform edge in the summation waveform and the determination threshold value is calculated, and predetermined time widths (determination times) before and after the reference point on the time axis (number-of-stages axis) are respectively set. A range including the two determination time widths is defined as an integration range 209.

By summing the absolute values of the difference between the determination threshold value and the summation waveform over the integration range 209, the size of the area for the cumulative value 207 and an area for the lower cumulative value 208 can be calculated. The integration range 209 corresponds to a portion of the waveform edge in the summation waveform, and it is possible to determine that the reception signal amount is larger as the inclination of the waveform edge is steeper. That is, it is possible to determine that the reception signal amount is larger as the calculated total of the area of the upper cumulative value 207 and the area of the lower cumulative value 208 is larger.

Therefore, it is possible to calculate the reception signal amount by multiplying the calculated magnitude of the total area by a constant coefficient. Alternatively, the reception signal amount may be calculated by using a multidimensional function that includes the calculated magnitude of total area as a variable. Further, it is possible to decide the reception signal amount corresponding to the calculated inclination by referring to a table that predefines a relationship between the magnitude of the total area and the reception signal amount.

It is possible to calculate the intensity of the reflection signals received by the displacement sensor 1, that is, the reception signal amount through the aforementioned processing procedure. In a case in which the calculated reception signal amount is outside a predefined proper range, processing of appropriately adjusting the measurement state, which will be described later, may be executed.

Note that although FIG. 13 exemplifies the processing of calculating the area defined by the summation waveform with reference to the determination threshold value as the procedure for calculating the area, the processing is not limited thereto, and the cumulative value as a reference can be arbitrarily decided. For example, a position corresponding to ½ of a total number of times of accumulation of the temporal waveforms of the binary signals (that is, a theoretical maximum value of the cumulative values illustrated in FIG. 13) may be regarded as a reference, and the area defined by the cumulative value as a reference and the summation waveform may be calculated.

(e7: Statistical Processing)

Although the method of calculating the reception signal amount from one summation waveform or the summation waveform after the filtering has been described as the aforementioned processing for convenience of explanation, the reception signal amount that serves as a representative value may be calculated by calculating the respective reception signal amounts from a plurality of summation waveforms and applying statistical processing such as averaging to these reception signal amounts.

F. Device Output

The reception signal amount calculated by the aforementioned method may be output to outside of the sensor, such as to a user.

(f1: Visual Output)

The displacement sensor 1 according to the embodiment has an output unit that visually outputs information indicating the magnitude of the calculated reception signal amount. The indicator 51, the first display lamp 55, the second display lamp 56, and the like illustrated in FIG. 1 correspond to such an output unit.

More specifically, meters that indicate a numerical value indicating the calculated reception signal amount, a degree of the reception signal amount, and the like may be displayed with the indicator 51 (see FIG. 1) arranged on the case body 2. Further, in a case in which the calculated reception signal amount falls below a predefined lower limit threshold value, a display mode may be changed (for example, blinking or warning display) in order to notify the user of the falling.

In addition, a lighting state of the first display lamp 55 and/or the second display lamp 56 arranged on the case body 2 may be changed in accordance with the calculated reception signal amount. For example, the display lamp may be turned on or displayed with a blue color in a case in which the calculated reception signal amount is greater than the lower limit threshold value, and the display lamp may be turned off or displayed with a red color in a case in which the calculated reception signal amount is less than the lower limit threshold value.

It is possible for the user to ascertain at a first sight whether or not the measurement using the displacement sensor 1 is being stably performed by the calculated reception signal amount being output to the user in a visible manner as described above.

A warning sound, an alarm, or the like may be generated in addition to the aforementioned visual output in a case in which the calculated reception signal amount is less than the lower limit threshold value. It is possible to quickly ascertain that some malfunction has occurred in the measurement state of the displacement sensor 1 by using such a visual notification means.

(f2: External Output) Content of the notification provided via the indicator 51, the first display lamp 55, and the second display lamp 56 as described above may be output to an external device other than the displacement sensor 1 via an arbitrary signal line, a communication mechanism, or an interface. That is, the displacement sensor 1 according to the embodiment may have an output unit that externally outputs the information indicating the magnitude of the calculated reception signal amount.

An analog output or a digital output is assumed as an output mode via an arbitrary signal line. In a case of the analog output, a digital-to-analog (D/A) converter or the like may be provided, and a current value (for example, in a range of 4 m A to 20 m A) or a voltage value (for example, a range of 1 V to 5 V or 0 V to 5 V) in accordance with the magnitude of the calculated reception signal amount may be output. In a case of a digital output, an ON/OFF signal indicating whether or not the calculated reception signal amount exceeds a predefined threshold value may be output. In this case, the output can be realized by using a converter, a relay circuit, and the like for comparing the calculated reception signal amount with the threshold value.

A configuration necessary for performing such an external output via the signal line may be realized on the interface unit 124 (see FIG. 4), for example.

Further, serial communication, parallel communication, wired communication mechanisms such as a local area network (LAN), wireless communication mechanisms such as a wireless LAN and Bluetooth (registered trademark), and various memory cards, for example are assumed as the arbitrary communication mechanism or the interface.

It is possible to more easily realize the configurations such as a production device and the like including the displacement sensor 1, by implementing such a mechanism for outputting information to the outside of the sensor. In addition, since the user can know the specific calculated reception signal amount, the user can easily ascertain a degree of reliability in measurement of the distance.

G. Processing of Appropriately Adjusting Measurement State

The measurement state may be appropriately adjusted by using the reception signal amount calculated by the aforementioned method. Note that various kinds of processing described below can be appropriately combined.

(g1: Adjustment of Intensity of Emitted Pulses)

First, processing of appropriately adjusting the measurement state by adjusting the intensity of the emitted pulses in accordance with the calculated reception signal amount will be described.

In a case in which the reception signal amount is lower than the predefined lower limit threshold value during the measurement of the displacement sensor 1, processing of increasing the reception signal amount is preferably performed to maintain a constant optimal detection state. Examples of the processing of increasing the reception signal amount include the examples as follows.

(1) Increasing the intensity (power) of the emitted pulses emitted from the light emitting element 10.

(2) Increasing the length of the emission period (a pulse width or a duty ratio) of the emitted pulses emitted from the light emitting element 10.

(3) Enhancing reception gains in the receiving unit (the light receiving element 20 and the reception circuit 22).

(4) Increasing the number of times of accumulation of the temporal waveforms in the waveform summation unit 110.

It is possible to increase the reception signal amount and to maintain the stable measurement state by executing at least one of the processing (1) to the processing (4) described above.

Additionally, in contrast, in a case in which the reception signal amount exceeds a predefined upper limit threshold value during the measurement using the displacement sensor 1, processing of reducing the reception signal amount is preferably performed to maintain the constant optimal detection state. As the processing of reducing the reception signal amount, control that is completely opposite to (1) to (4) described above, for example, can be employed.

In the processing represented above as (1), the emitting unit (the light emitting element 10 and the emission circuit 12) causes the intensity of the emitted pulses to change in accordance with the magnitude of the calculated reception signal amount. In the processing represented above as (2), the emitting unit (the light emitting element 10 and the emission circuit 12) causes the length (the pulse width or the duty ratio) of the emission period to change. Such a change in behavior may be realized by providing an intensity command from the reception signal amount calculation unit 112 to the pulse generation unit 102. The pulse generation unit 102 outputs commands (the timing command and the intensity command) to the emission circuit 12 in accordance with the intensity command from the reception signal amount calculation unit 112.

(A) and (B) of FIG. 14 are diagrams for describing an example of adjustment of intensity of the emitted pulses by using the displacement sensor 1 according to the embodiment.

(A) of FIG. 14 illustrates an example in which the intensity (power) of the emitted pulses emitted from the light emitting element 10 is enhanced, which is represented above as (1). It is possible to realize the adjustment of the intensity of the emitted pulses by adjusting the amplitude of the emitted pulses as illustrated in (A) of FIG. 14.

(B) of FIG. 14 illustrates an example in which the emission period (the pulse width or the duty ratio) of the emitted pulses emitted from the light emitting element 10 is extended, which is represented above in (2). It is possible to realize the adjustment of the intensity of the emitted pulses by adjusting the amplitude width of the emitted pulses as illustrated in (B) of FIG. 14.

The receiving unit (the light receiving element 20 and the reception circuit 22) causes the reception gains with respect to the reflection signals to change in accordance with the magnitude of the calculated reception signal amount in the processing represented above as (3). Specifically, light receiving sensitivity of the light receiving element 20 that forms the reception circuit 22 may be changed, or an amount of amplification at the reception circuit 22 or the like may be changed. Such a change in behavior may be realized by providing a command related to the reception gains from the reception signal amount calculation unit 112 to the reception circuit 22.

In addition, the waveform summation unit 110 may cause the number of temporal waveforms of the binary signals used to generate the summation waveform to change in accordance with the magnitude of the calculated reception signal amount in the processing represented above as (4). Such a change in behavior may be realized by providing a command related to the number of times of accumulation related to the reception gains from the reception signal amount calculation unit 112 to the waveform summation unit 110.

It is possible to maintain the preferable measurement state by appropriately executing the processing of increasing or reducing the reception signal amount as described above in accordance with the magnitude of the calculated reception signal amount.

(g2: Output Determination Unit 120)

A determination criterion in the output determination unit 120 may be changed in accordance with the calculated reception signal amount. For example, the hysteresis width used for determining the threshold value may be dynamically set in accordance with the calculated reception signal amount, during the measurement using the displacement sensor 1. In this case, the hysteresis width may be decided from the calculated reception signal amount in accordance with a predefined function, or the hysteresis width corresponding to the calculated reception signal amount can be decided by referring to a table that predefines a relationship between the reception signal amount and the hysteresis width.

FIG. 15 is a diagram for describing an example of processing of adjusting the hysteresis width that is used to determine the threshold value in the displacement sensor 1 according to the embodiment. Since stability of the measurement state is relatively high in a case in which the calculated reception signal amount is relatively large, for example, as illustrated in FIG. 15, it is preferable to enhance the detection sensitivity by relatively reducing the hysteresis width. In contrast, since the stability of the measurement state is relatively low in a case in which the calculated reception signal amount is relatively small, it is preferable to increase the detection stability by relatively increasing the hysteresis width.

In this manner, the output determination unit 120 changes the hysteresis width for switching between the determination result that the object OBJ is present and the determination result that the object OBJ is not present in accordance with the magnitude of the calculated reception signal amount. It is possible to maintain the constant optimal determination by dynamically setting the hysteresis width used to determine the threshold value in the output determination unit 120 in accordance with the calculated reception signal amount.

Note that the hysteresis width set in the output determination unit 120 may be displayed with the indicator 51 arranged on the case body 2. The user can easily know the magnitude of a detectable grade difference (gap) with respect to the object OBJ by checking the displayed hysteresis width.

H. Conclusion

The displacement sensor 1 according to the embodiment detects a time (reception point) required for the emitted pulses to be reflected by the object OBJ and to return on the basis of the summation waveform (histogram) accumulated over a plurality of binary signals and calculates the distance between the displacement sensor 1 and the object OBJ from the detected time. Also, the displacement sensor 1 calculates the reception signal amount corresponding to the S/N ratio at that time on the basis of the feature amount in the cumulative (height) direction that appears in the summation waveform. Then, the displacement sensor 1 notifies the user or the like of the calculated reception signal amount and executes processing of appropriately adjusting the measurement state in accordance with the calculated reception signal amount.

As the feature amount in the cumulative (height) direction that appears in the summation waveform, the inclination of the summation waveform, the height indicated by the summation waveform, the area defined by the summation waveform, or the like is assumed. A waveform after the filtering processing for stabilizing the waveform is performed on the summation waveform (histogram) may be used, or a waveform with a resolution increased in the time direction due to performing interpolation processing may be used when such a feature amount in the cumulative (height) direction that appears in the summation waveform is calculated.

It is possible for the user to check a degree of a margin in the reception signal amount in the current measurement state by notifying the user of the calculated reception signal amount. In addition, it is possible for the user to check whether or not the emitted pulse sending signal is emitted to an intended position by arranging the displacement sensor 1 while checking a change in information indicating the magnitude of the reception signal amount in the notification.

It is possible to set or realize an appropriate detection grade difference (gap) that causes no chattering in the determination output by causing the hysteresis width at the time of determining the threshold value with respect to the calculated distance to change in accordance with the calculated reception signal amount. Specifically, the hysteresis width is relatively reduced in a case in which the reception signal amount is large since it is possible to determine that the measurement state is stable, and the hysteresis width is relatively increased in a case in which the reception signal amount is small since it is possible to determine that the measurement state is unstable.

Further, it is possible for the user to determine whether or not adaption to a target application (environment) is available by notifying the user of the set hysteresis width (that is, the detectable grade difference (gap)).

Although the configuration example of the two-stage measurement, namely the rough measurement and the fine measurement has been described above as an example, the configuration is not limited thereto, and a configuration in which only measurement corresponding to either one of the rough measurement and the fine measurement is implemented may be employed. Also, it is possible to calculate the summation waveform in each of the rough measurement and the fine measurement, and it is possible to perform the processing of calculating the reception signal amount as described above on any of the summation waveforms.

The embodiment disclosed herein has been described only for the illustrative purpose in terms of all points and should be considered as being not restrictive. The scope of the present disclosure is indicated by the claims rather than the above description, and all modifications within meanings and the scope equivalent to the scope of the claims are intended to be included.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A displacement sensor comprising:
    a case body;
    an emitting unit that is disposed in the case body and periodically emits pulse signals;
    an output unit that is disposed on one side surface of the case body and visually outputs information indicating a magnitude of the calculated reception signal amount;
    a receiving unit that receives reflection signals that are generated from the pulse signals emitted from the emitting unit and reflected by an object and outputs binary signals that indicate signal intensity of the received reflection signals;
    a waveform summation unit that generates a summation waveform by accumulating a plurality of temporal waveforms of the binary signals for respective corresponding periods of times with reference to emission timings of the corresponding pulse signals;
    a distance calculation unit that calculates a value that indicates a distance to the object on the basis of waveform features corresponding to waveform features of the pulse signals that appear in the summation waveform;
    a reception signal amount calculation unit that calculates a reception signal amount that is intensity of the reflection signals received by the receiving unit on the basis of feature amounts indicated by one or a plurality of cumulative values that appear in the summation waveform; and
    an output determination unit that determines whether or not the object is present on the basis of a value indicating the distance calculated by the distance calculation unit,
    wherein the output determination unit changes a hysteresis width for switching between a determination result that the object is present and a determination result that the object is not present, in accordance with the magnitude of the calculated reception signal amount.

2. The displacement sensor according to claim 1, further comprising:
an external output unit that is disposed on an other side surface of the case body and externally outputs information indicating a magnitude of the calculated reception signal amount.

3. The displacement sensor according to claim 1,
wherein the emitting unit causes at least one of an intensity and a length of an emitting period of a pulse signal to be emitted, to change in accordance with the magnitude of the calculated reception signal amount.

4. The displacement sensor according to claim 1,
wherein the receiving unit causes reception gains with respect to the reflection signals to change in accordance with the magnitude of the calculated reception signal amount.

5. The displacement sensor according to claim 1,
wherein the waveform summation unit causes a number of temporal waveforms of the binary signals that are used to generate the summation waveform to change in accordance with the magnitude of the calculated reception signal amount.

6. A displacement sensor, comprising:
a case body;
an emitting unit that is disposed in the case body and periodically emits pulse signals;
an output unit that is disposed on one side surface of the case body and visually outputs information indicating a magnitude of the calculated reception signal amount;
a receiving unit that receives reflection signals that are generated from the pulse signals emitted from the emitting unit and reflected by an object and outputs binary signals that indicate signal intensity of the received reflection signals;
a waveform summation unit that generates a summation waveform by accumulating a plurality of temporal waveforms of the binary signals for respective corresponding periods of times with reference to emission timings of the corresponding pulse signals;
a distance calculation unit that calculates a value that indicates a distance to the object on the basis of waveform features corresponding to waveform features of the pulse signals that appear in the summation waveform; and
a reception signal amount calculation unit that calculates a reception signal amount that is intensity of the reflection signals received by the receiving unit on the basis of feature amounts indicated by one or a plurality of cumulative values that appear in the summation waveform;
wherein the reception signal amount calculation unit calculates the reception signal amount on the basis of a magnitude of an inclination of a waveform edge in the summation waveform in which the inclination of the waveform edge is an amount of change in the cumulative values with respect to time.

7. A displacement sensor according to claim 1, comprising:
a case body;
an emitting unit that is disposed in the case body and periodically emits pulse signals;
an output unit that is disposed on one side surface of the case body and visually outputs information indicating a magnitude of the calculated reception signal amount;
a receiving unit that receives reflection signals that are generated from the pulse signals emitted from the emitting unit and reflected by an object and outputs binary signals that indicate signal intensity of the received reflection signals;
a waveform summation unit that generates a summation waveform by accumulating a plurality of temporal waveforms of the binary signals for respective corresponding periods of times with reference to emission timings of the corresponding pulse signals;
a distance calculation unit that calculates a value that indicates a distance to the object on the basis of waveform features corresponding to waveform features of the pulse signals that appear in the summation waveform; and
a reception signal amount calculation unit that calculates a reception signal amount that is intensity of the reflection signals received by the receiving unit on the basis of feature amounts indicated by one or a plurality of cumulative values that appear in the summation waveform;
wherein the reception signal amount calculation unit calculates the reception signal amount on the basis of an area that appears in the summation waveform and is defined by an inclination of a waveform edge in the summation waveform, the area is associated with a predefined reference point, and the predefined reference point is a crossing point between the waveform edge in the summation waveform and a determination threshold value.

8. A displacement sensor, comprising:
a case body;
an emitting unit that is disposed in the case body and periodically emits pulse signals;
an output unit that is disposed on one side surface of the case body and visually outputs information indicating a magnitude of the calculated reception signal amount;
a receiving unit that receives reflection signals that are generated from the pulse signals emitted from the emitting unit and reflected by an object and outputs binary signals that indicate signal intensity of the received reflection signals;
a waveform summation unit that generates a summation waveform by accumulating a plurality of temporal waveforms of the binary signals for respective corresponding periods of times with reference to emission timings of the corresponding pulse signals;
a distance calculation unit that calculates a value that indicates a distance to the object on the basis of waveform features corresponding to waveform features of the pulse signals that appear in the summation waveform;
a reception signal amount calculation unit that calculates a reception signal amount that is intensity of the reflection signals received by the receiving unit on the basis of feature amounts indicated by one or a plurality of cumulative values that appear in the summation waveform; and
a filtering processing unit that performs filtering processing on a summation waveform that is generated by the waveform summation unit,
wherein the reception signal amount calculation unit calculates the feature amounts indicated by the one or the plurality of cumulative values from the summation waveform that the filtering processing is performed by the filtering processing unit.

* * * * *